United States Patent [19]
Lettan et al.

[11] 3,809,460
[45] May 7, 1974

[54] OPTICAL CONTROL MECHANISM

[75] Inventors: Richard H. Lettan, Pittsford; Robert J. McGuire, Rochester, both of N.Y.

[73] Assignee: Eastman Kodak Company, Rochester, N.Y.

[22] Filed: Nov. 22, 1972

[21] Appl. No.: 308,918

[52] U.S. Cl.............. 350/254, 350/39, 350/247, 353/39
[51] Int. Cl. ............................................ G02b 7/02
[58] Field of Search .......................... 350/40–47, 350/39, 242–257; 353/78

[56] References Cited
UNITED STATES PATENTS

| | | | |
|---|---|---|---|
| 2,937,569 | 5/1960 | Wilton | 353/78 |
| 1,197,391 | 9/1916 | Ott | 350/254 |
| 3,487,761 | 1/1970 | La Rue | 350/254 |
| 3,692,398 | 9/1972 | Strauss | 353/78 |
| 2,720,138 | 10/1955 | Michel | 350/254 |

*Primary Examiner*—John K. Corbin
*Assistant Examiner*—Michael J. Tokar
*Attorney, Agent, or Firm*—William F. Noval

[57] ABSTRACT

There is disclosed an optical control mechanism for use in a projection device such as a microfilm reader. The optical control mechanism effects selective positioning of one of two lens assemblies on the optical axis of the projection apparatus and locks the selected lens assembly in position. A pair of projection lenses of different magnification are mounted on a bracket which is keyed to a rotatably mounted shaft. The shaft is rotatable about an axis substantially parallel to a portion of the optical axis of the projection apparatus so that one of the projection lenses may be selectively aligned with the optical axis of the projection apparatus by rotation of the shaft. An optical control mechanism includes a control member such as a knob which is mounted for rotation between a first control position and a second control position. The control member is operatively coupled to the shaft by means of a bell-crank connected to the control member, a spherical member secured to the free end of the bell crank and a U-shaped spring member operatively connected to the shaft and projecting radially therefrom. The spherical member is located between the upstanding arms of the U-shaped member and is in substantial operative engagement therewith.

3 Claims, 7 Drawing Figures

OPTICAL CONTROL MECHANISM

BACKGROUND OF THE INVENTION

1. Field of the Invention

This invention relates to projection apparatus and more particularly relates to dual magnification projection apparatus wherein an optical control mechanism is provided for selectively aligning one of a pair of lens assemblies with the optical axis of the projection apparatus and for locking the selected lens assembly in position.

2. Description of the Prior Art

Projection apparatus for selectively projecting images at different magnification ratios from image bearing media are well known in the art. Generally, in such apparatus a plurality of projection lenses of different magnification are mounted on a rotatable turret for selective alignment with the optical axis of the projection apparatus. Where the projection lenses are supported in spaced angular relationship by a rotatably mounted turret and where the projection lens turret is mounted for rotation about a substantially vertical axis, rotation of the turret may be effected in a relatively smooth and unjerky manner. However, when the turret is mounted for rotation about an axis which is horizontal or inclined to the vertical, the weight of the lenses may cause undesirable jerkiness, unevenness of motion as the turret is rotated to change lenses. Where the lenses are mounted in the latter manner, it is therefore desirable that means be provided for effecting lens change in a smooth and unjerky manner. It is also desirable that the selected lens be locked in position so that such lens will not be knocked out of alignment by accidental jarring of the projection apparatus.

SUMMARY OF THE INVENTION

It is therefore an object of the present invention to provide an optical control mechanism for projection apparatus wherein projections lenses of different magnification may be selectively aligned with the optical axis of the apparatus.

It is a further object of the present invention to provide an optical control mechanism in projection apparatus wherein the selective alignment of one of a pair of lens assemblies with the optical axis of the projection apparatus is effected in a smooth and unjerky manner and wherein a wedging force is provided through coupling means to lock a selected lens assembly in position.

In general, the optical control mechanism of the present invention is provided in optical apparatus including first optical means, second optical means and first means for mounting said optical means for rotation between a first position and a second position. The optical control mechanism preferably comprises control means for rotating said means for mounting between said first position and said second position; second means for mounting said control means for movement between a first control position and a second control position, and means for operatively coupling said control means and said first means for mounting; wherein when said control means is moved between said first control position and said second control position, said means for coupling rotates said first means for mounting between said first position and said second position and applies, in said second position, a wedging force to substantially lock said first means for mounting in said second position and wherein when said control means is moved between said second control position and said first control position, said means for coupling rotates said first means for mounting between said second position and said first position and applies, in said first position, a wedging force to said first means for mounting to substantially lock said first means for mounting in said first position.

The invention, and its objects and advantages, will become more apparent in the detailed description of the preferred embodiments presented below.

BRIEF DESCRIPTION OF THE DRAWINGS

In the detailed description of the preferred embodiment of the invention presented below, reference is made to the accompanying drawings in which.

BRIEF DESCRIPTION OF THE PREFERRED EMBODIMENT

Figure 3:
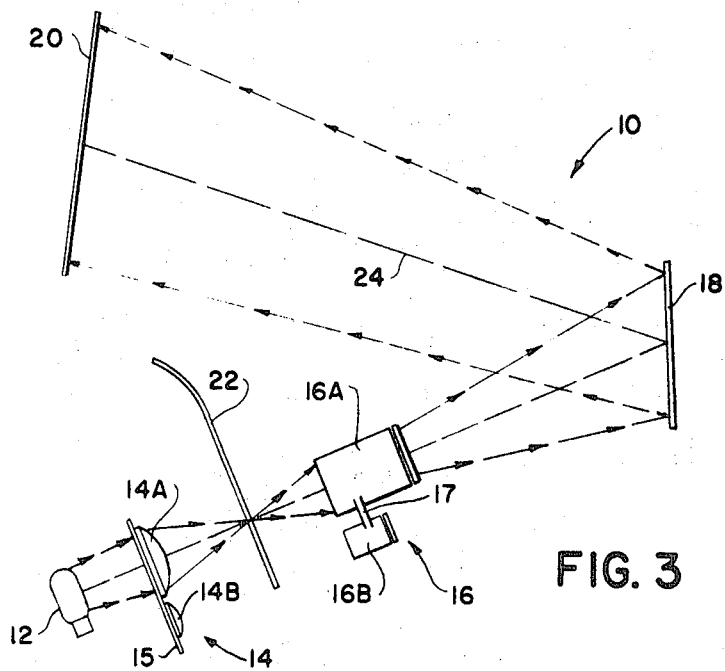
FIG. 3 is a diagrammatic view of a microfilm reader including the apparatus shown in FIG. 1.

Referring now to the drawings there is shown projection apparatus including a preferred embodiment of optical control mechanism according to the present invention. The projection apparatus may for example form a part of a microfilm reader 10 as shown in FIG. 3. Microfilm Reader 10 includes a source of light 12, light condenser means 14 including condenser lens 14A and 14B mounted on bracket 15; image projection means 16 including projection lens 16A and 16B mounted on bracket 17; image reflecting means such as mirror 18; and image display means such as screen 20. An image bearing medium such as microfilm 22 having image bearing portions is supported between light condenser means 14 and image projection means 16 by suitable support means (not shown). In operation, light from light source 12 is gathered and condensed by condenser means 14 into a light beam which is passed through an image bearing portion of image bearing medium 22 located in the focal plane of projection means 16. The illuminated image is then projected by projection means 16 along optical axis 24 of reader 10 and displayed in an enlarged form on rear projection screen 20 after being reflected from mirror 18.

Medium 22 may take any form of image bearing medium having image bearing portions, such as aperture cards, microfiche, microfilm jackets and elongated microfilm strips in convolute rolls. Generally, where microfiche or the like are to be viewed, means are provided for supporting the medium in the focal plane of projection means 16 for movement in mutually orthogonal directions relative to the optical axis of reader 10. The support means may include a pair of transparent members which hold the medium in the focal plane. Where the image bearing medium is strip film, means are provided for transporting the film along a path intersecting the reader optical axis in the region of which a pair of openable glass flats may be used to maintain the microfilm in the focal plane.

Figure 1:
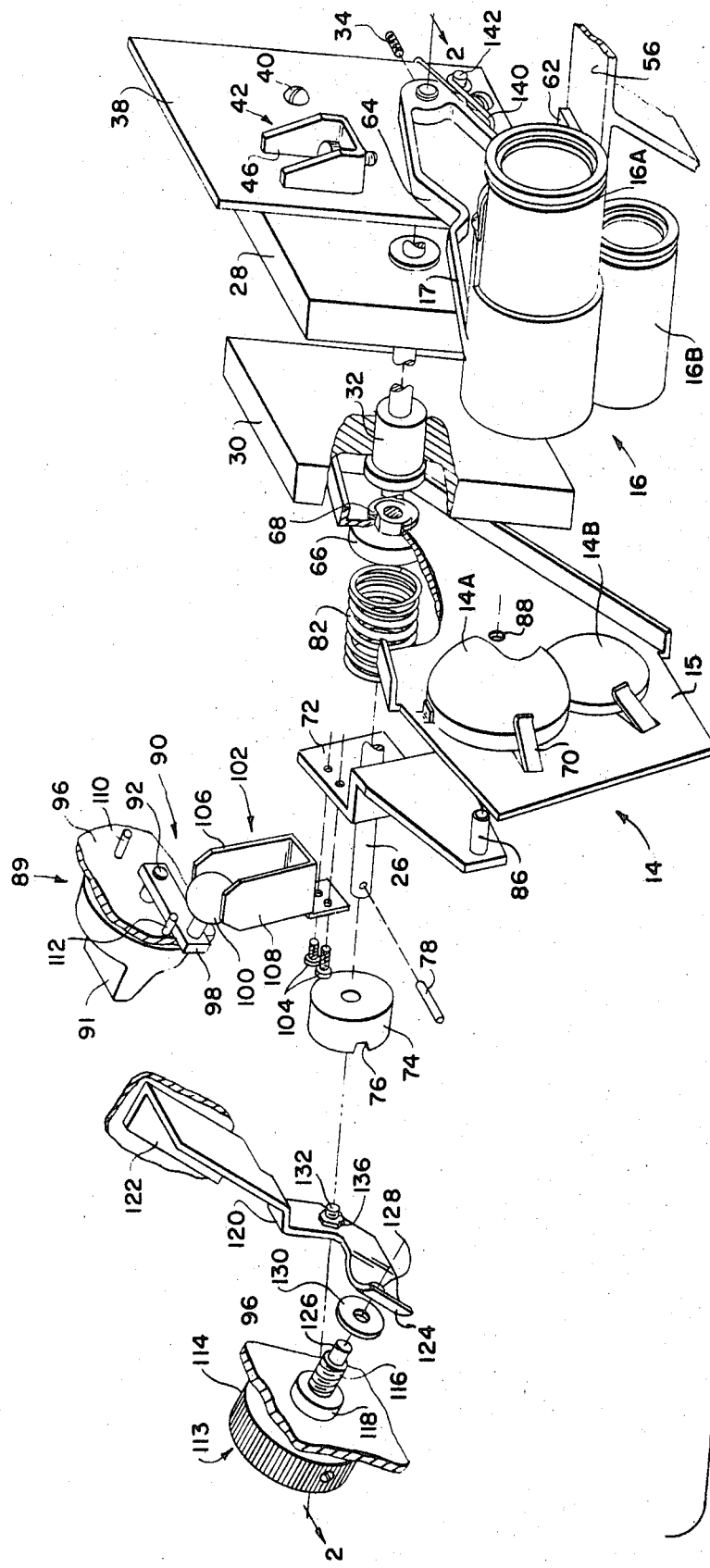
FIG. 1 is an exploded partially sectional view of projection apparatus including a preferred embodiment of optical control mechanism of the present invention.
Figure 2:
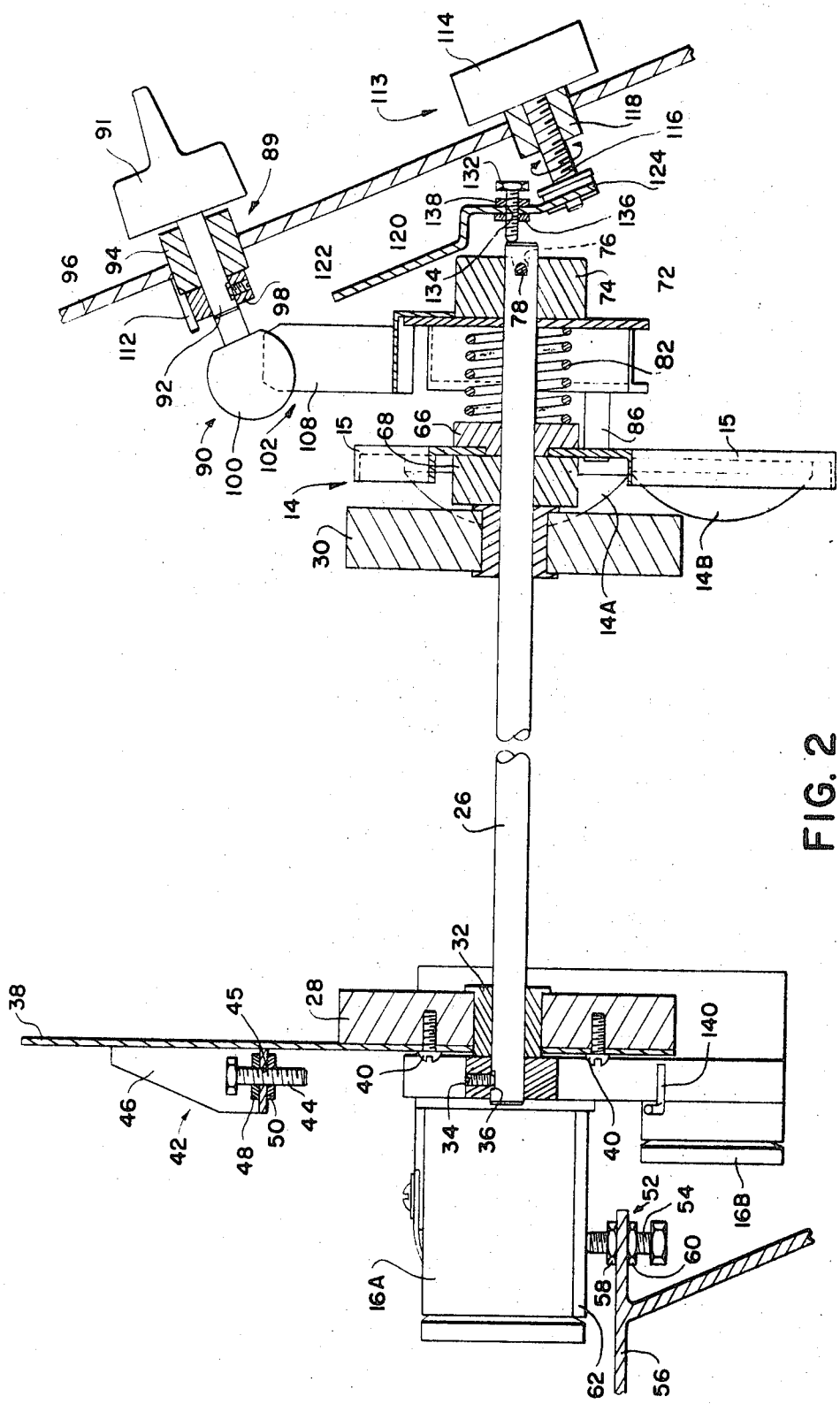
FIG. 2 is a partially sectional elevational view of the apparatus of FIG. 1.

Referring now more particularly to FIGS. 1 and 2 there is shown a shaft 26 journaled in frame members 28 and 30 of reader 10 by means of bearings 32. As will be described in greater detail hereinafter, shaft 26 is also slidingly mounted for axial movement in bearings 32. Condenser lens bracket 15 is keyed to one end of shaft 26 by locking screw 34 which projects into recess 36 in shaft 26. A plate 38 is secured to reader member 28 by means of suitable screws 40. Plate 38 is provided with a stop 42 which includes screw 44 passing through hole 45 of bracket 46 secured to plate 38. Locking nuts 48 and 50 are threaded on screw 44 and permit adjustment of the position thereof. A second stop 52 includes adjustable screw 54 threaded on reader bracket member 56 by means of lock nuts 58 and 60. Stops 42 and 52 may be adjusted to limit the desired angular rotation of projection lens assembly 16 so that a selected one of projection lenses 16A, 16B may be aligned with optical axis 24 of reader 10.

Figure 4:
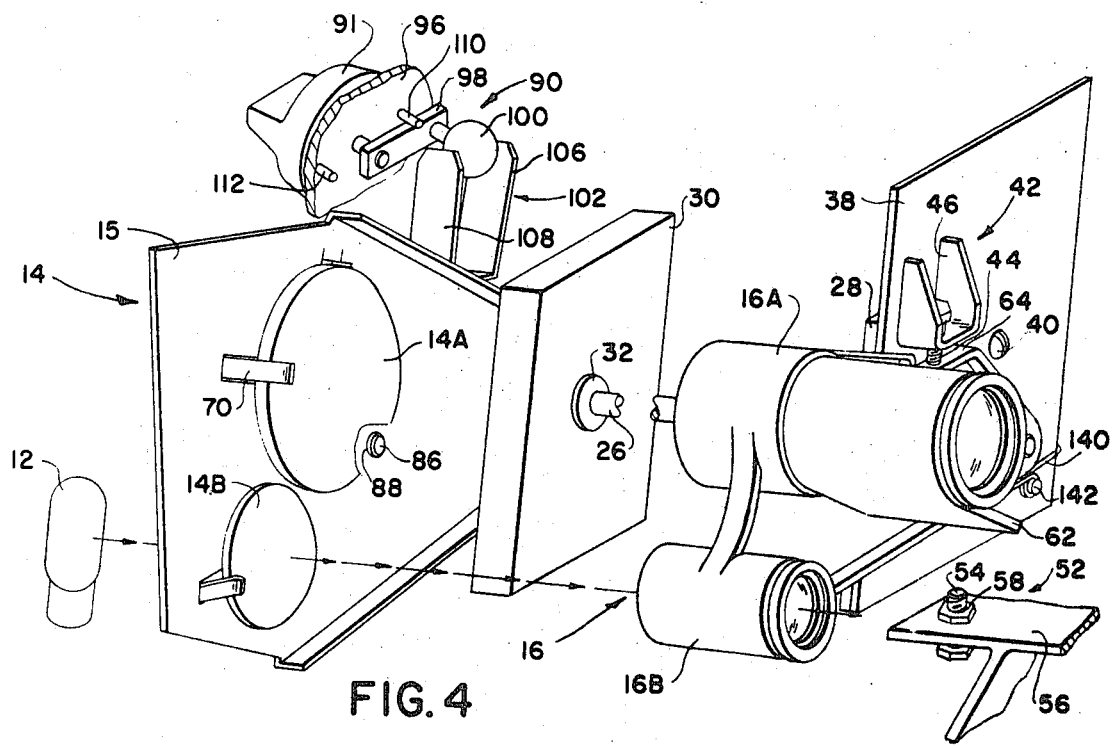
FIG. 4 is a partially sectional elevational view taken along line 4—4 of FIG. 1.

In FIG. 2 projection lens barrel 62 supporting projection lens 16A is shown as bearing against stop 52 which locates projection lens 16A in alignment with optical axis 24. In FIG. 4, segment 64 of bracket 17 is shown as bearing against screw 44 in order to align projection lens 16B with axis 24.

Condensor lens bracket 15 is mounted on shaft 26 by means of mounting members 66 and 68. Condenser lens 14A and 14B are mounted on bracket 15 by means of clips 70 and members 71.

An auxiliary bracket 72 having hub member 74 with a V-shaped slot 76 is keyed to shaft 26 by means of a pin 78 projecting from the end of shaft 26. A coil spring 82 surrounding shaft 26 is held in compression between member 66 and bracket 72 and causes condenser lens bracket 15 to bear against bearing 32 and pin 78 to bottom in slot 76 of hub member 74 to thus key bracket 72 to shaft 26 for rotation therewith. Condenser lens bracket 15 is keyed to auxiliary bracket 72 by means of pin 86 projecting through hole 88 in bracket 15 and thus is rotated in unison therewith.

A preferred optical control mechanism according to the present invention for effecting rotation of shaft 26 and thereby rotation of condenser lenses 14A and 14B and projection lenses 16A and 16B includes movably mounted control means 89 and coupling means 90. As shown, control means 89 includes knob 91 secured to shaft 92 journaled in bearing 94 mounted by reader member 96. A crank arm 98 is pinned at one end to shaft 92 and has mounted on its other end a substantially spherical coupling member 100 which forms part of coupling means 90.

Means 90 also includes a U-shaped spring member 102 secured to auxiliary bracket 72 by means of suitable screws 104. Member 102 has a pair of spaced resilient arms 106 and 108 which project in a substantially radial direction from shaft 26. Spherical member 100 is located between arms 106 and 108 near the ends thereof.

Stops 110 and 112 projecting from member 96 limit rotation of crank arm 98 to an angle of approximately 180° as will be described in greater detail hereinafter.

Focusing means 113 are provided and include a manually rotatable control member such as knob 114 mounted on screw 116 which is threaded through bearing 118 mounted by member 96. A lever arm 120 has an end 122 affixed to reader 10 by means not shown and has a free end 124 having a hole 128 therein. Washer 130 slipped on bearing end 126 of screw 116 projects through hole 128 in end 124. Washer 130 is provided to effect bearing engagement between screw 116 and lever arm 120.

Lever arm 120 is also provided with an adjustable screw 132 threaded through hole 134 in arm 120 and locked in position by locking nuts 136 and 138. The end of screw 132 bears against the end of shaft 26.

A torsion spring 140 is coiled on pin 142 projecting from member 38 and has one end engaged with the side of member 38 and the other end engaged with bracket 17. Spring 140 counterbalances the weight of projection lens means 16 and condenser lens means 14.

The operation of the apparatus described hereinabove is as follows:

When an individual who is utilizing reader 10 to inspect information on image bearing medium 22 desires to view such information at a selected magnification, control member 91 is manually rotated to align it with appropriate magnification identifying indicia (not shown) on the front surface of member 96. As described hereinabove, member 91 is rotatable through an angle of substantially 180° between (1) a first control position (as shown in FIG. 1) wherein lens 14A and lens 16A are aligned with reader optical axis 24 to project an image of a first magnification onto screen 20 and (2) a second control position (as shown in FIG. 4) wherein lens 14B and lens 16B are aligned with reader optical axis 24 to project an image of a second magnification onto screen 20.

Figure 5A:
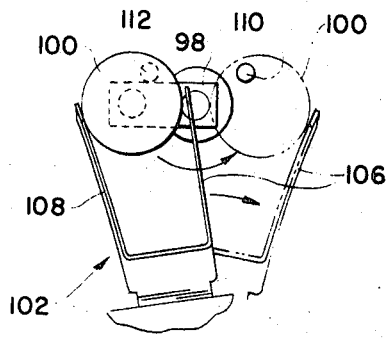
FIGS. 5A, 5B and 5C are detail views respectively of the coupling means, the condenser lenses and the projection lenses of the apparatus of FIG. 1.

In the position shown in FIG. 1, arm 98 engages stop 112 and spherical member 100 applies a wedging force to shaft 26 through bearing engagement of member 100 with arm 108 of spring member 102. As member 91 is rotated in a counterclockwise direction (as viewed in FIG. 1) member 100 is rotated through an 180° arc between the position shown in solid lines in FIG. 5A and the position shown in dashed lines in FIG. 5A. In the latter position, member 100 is in bearing engagement with arm 106 of member 102 and applies a counter wedging force or torque to shaft 26. As member 100 is rotated from the position shown in FIG. 1, the wedging force on arm 108 decreases and a force applied to arm 106 causes shaft 26 to rotate through the connection therewith by means of spring 102 and brackets 72 and 15.

When shaft 26 has been rotated by coupling means 90 so that bracket 17 engages stop 42, member 100 will not have yet traversed its entire arc of movement. The remaining movement of member 100 will apply an increasing wedging force to arm 106 of spring 102 until arm 98 engages stop 110. In this position, lens 14B and lens 16B will substantially locked into alignment with reader optical axis 24, thus preventing accidental jarring of these lens out of alignment with axis 24.

When it is desired to change the magnification from that provided by lens 16B to that provided by lens 16A, the operator rotates member 91 so that member 100 traverses an arc of 180 degrees in a clockwise direction (as shown in FIG. 1) to thus cause the wedging force applied by member 100 to arm 106 to decrease and so that the bearing engagement of member 100 with arm 108 causes rotation of shaft 76 and brackets 15 and 17 until lens barrel 62 engages stop 52. Further movement of member 100 applies an increasing wedging force to arm 108 until arm 98 engages stop 112. As described hereinabove, in this position, lens 14A and lens 16A will be substantially locked into alignment with reader optical axis 24, such that accidental misalignment will be prevented.

As member 91 is rotated through an 180° arc, shaft 26 is rotated at a sinusoidal velocity by coupling means 90 with minimum velocities at the beginning and end of its travel. Thus change of lenses is effected in a smooth and unjerky manner.

Since the axis of rotation of shaft 26 is at an angle to the axis of rotation of member 91, crank arm 98 rotates in a plane that is at an angle to the rotational plane of spring member 102. Spherical member 100 is in point contact with member 102 and the contact point traverses the distance between arms 106 and 108. This permits an offset motion to occur without binding and also permits angular coupling between shaft 26 and control member 91.

Focusing of projection lens means 16 relative to medium 22 is effected by rotation of member 114. Since bracket 17 is pinned to shaft 26, sliding movement of shaft 26 will provide movement of a selected lens 16A, 16B along optical axis 24 since the rotational axis of shaft 26 is substantially parallel to optical axis 24 in the region of projection means 16. If member 114 is rotated so that end 124 is moved towards lens 16 the bearing engagement of screw 132 against shaft 26 will cause shaft 26 to move to the right (as viewed in FIG. 1) and projection means 16 will also be moved to the right. Conversely, if the rotation of member 114 causes end 124 to move away from lens 16, the action of spring 42 on bracket 72 causes shaft 26 to move to the left and projection lens means 16 will also be moved to the left. Since spring 42 urges condenser lens bracket 15 against fixed bearing 32, condenser lens means 14 will not be moved axially as projection lens means 16 is moved relative to medium 22.

Figure 5B:
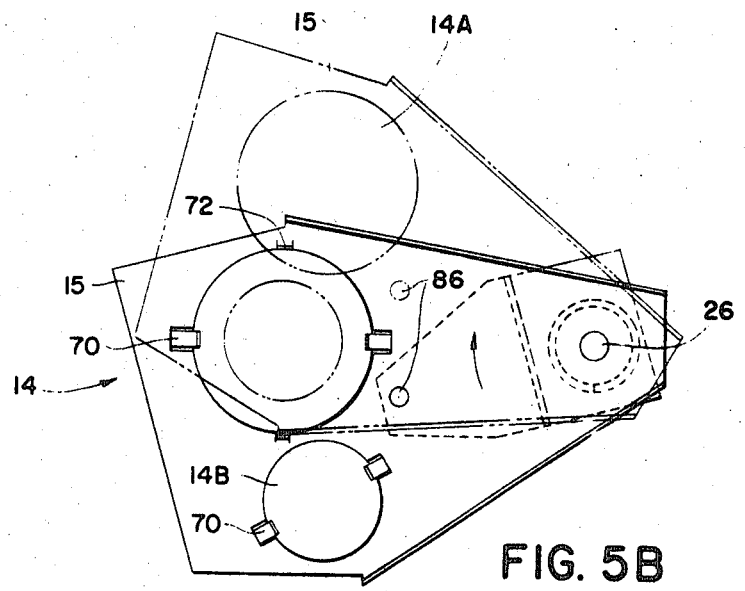
Figure 5C:
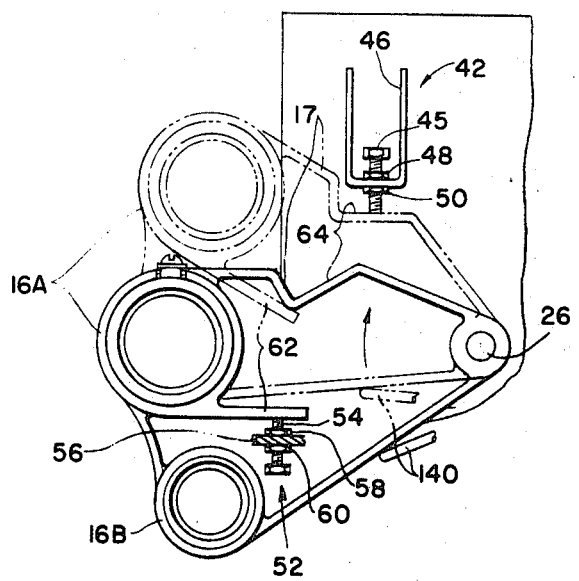

FIGS. 5B and 5C respectively show condenser means 14 and projection means 16 in the two operative positions in alignment with axis 24 as described in detail hereinabove and as shown in FIGS. 1 and 4.

It is thus seen that an optical control mechanism according to the present invention is provided wherein the magnification of an image projected from an image bearing medium may be selectively chosen by an operator and wherein the selected lens assembly is locked into position to prevent accidental misalignment thereof with the reader optical axis.

The invention has been described in detail with particular reference to preferred embodiments thereof, but it will be understood that variations and modifications can be effected within the spirit and scope of the invention.

We claim:

1. In optical apparatus having an optical axis, the combination comprising:
   a shaft;
   a first optical assembly;
   a second optical assembly;
   first means for mounting said first and second optical assemblies in spaced angular relation on said shaft,
   second means for mounting said shaft for rotation in opposite directions between a first position wherein said first optical assembly is aligned with said optical axis and a second position wherein said second optical assembly is aligned with said optical axis;
   first and second space spring members mounted by said shaft and extending substantially radially therefrom;
   a manually operable control member;
   a substantially spherical shaped member;
   third means for mounting said spherical member dependent from said control member and positioned between the first and second spring members; and
   fourth means for mounting said control member for movement through a range of movement in opposite directions between (1) a first override position wherein said spherical member bears against said first spring member to bend it in a direction opposite to one direction of movement of said shaft to tend to lock said shaft in said first shaft position; (2) and a second override position wherein said spherical member bears against said second spring member to bend it in a direction opposite to the other direction of movement of said shaft to tend to lock said shaft in said second shaft position; and (3) through a range of movement between the first and second override positions to move said shaft between said first and second shaft positions in the one direction and between said second and first shaft positions the other direction.

2. The combination of claim 1 wherein said first optical assembly includes a first projection lens and a first condenser lens aligned with said first projection lens and wherein said second optical assembly includes a second projection lens and a second condenser lens aligned with said second projection lens.

3. The combination of claim 2 wherein said third means for mounting includes a bell crank having one end thereof connected to said control member and the other end thereof connected to said spherical member and wherein said fourth means for mounting mounts said control member for rotation between said first and second override position and through an angle of rotation between said first and second override positions.

* * * * *